United States Patent Office 2,876,250
Patented Mar. 3, 1959

2,876,250

PROCESS FOR PURIFICATION OF CRUDE PYRETHRUM EXTRACTS

Thomas A. Haney, Stony Brook, N. Y., assignor to Olin Mathieson Chemical Corporation, a corporation of Virginia No Drawing. Application May 13, 1957
Serial No. 658,496

2 Claims. (Cl. 260—468)

This invention relates to improvements in the purification of pyrethrum extracts. More particularly this invention relates to the purification of crude concentrated pyrethrum extracts in kerosene or other higher boiling hydrocarbon solvents containing approximately 20 to 30 percent by weight of materials extracted from the pyrethrum flowers. One such extract is currently being imported into the United States and is commercially known as the 25 percent Penya extract.

When pyrethrum flowers are leached with kerosene or other higher boiling hydrocarbon solvents, not only are the insecticidally valuable pyrethrins dissolved, but also certain resins and other impurities contained in the flowers. The latter must be removed before the Penya extract can be diluted and prepared for resale to the consumer. Unless removed, these impurities will form sludges when the crude concentrated pyrethrum extract is diluted for use with Ultrasene and other commonly used highly refined kerosenes. Such a sludge generally clogs the nozzles of hand or machine-operated spraying devices. Furthermore, these sludges are readily precipitated by the Freons commonly used as aerosol propellants. Thus aerosol bombs are also subject to nozzle-fouling unless the crude extract is purified to remove the resin-like material.

The purification of the crude extract is generally accomplished by adding a non-solvent for the impurities such as a lower hydrocarbon, chilling and holding the mixture at a temperature of about $-10°$ C. to $-30°$ C. for several hours, and then centrifuging the cold mixture. Sufficient sludge can generally be removed by the various low-temperature centrifugation methods to give a pyrethrin solution suitable for concentration to the article of commerce known as Extract 100 containing 10 grams of pyrethrins in 100 milliliters of solvent. The latter extract is generally added to aersol devices and the maximum tolerance of Freon insoluble material therein should not exceed 0.50 percent. Insoluble material in excess of this amount may cause clogging of spray nozzles.

Prior purification processes have required a distillation step to remove the non-solvent used to precipitate the Freon-insoluble material in order to obtain Extract 100 having a pyrethrin concentration of 10 grams per 100 milliliters of solvent.

In accordance with this invention it has been discovered that the crude concentrated extract can be purified by a simple process which eliminates the concentration step involving the hazardous distillation of flammable materials.

The process for doing this involves diluting the crude concentrated extract with kerosene, preferably a highly refined kerosene of the kind generally used as a pyrethrum diluent, to a pyrethrins concentration of about 10 to 15 percent by weight, and adding about 0.01 percent to one percent by weight of trisodium phosphate dodecahydrate, based on the weight of diluted extract. The mixture is then heated to about 40° C. to 70° C. for about one to 24 hours. Subsequent chilling to $-10°$ C. to $-30°$ C. for about 1 to 24 hours followed by centrifugation, a filtration or other operation adapted to separate the sludge present, at $-10°$ C. to $-30°$ C. gives a clear pyrethrin solution. If the proportion of kerosene added is about one volume per volume of the crude concentrated extract, the resulting product will be approximately an Extract 100. Any color remaining in the solution after the sludge has been separated can be readily removed by conventional treatment as with an active carbon such as Darco S–51.

The following example further illustrates the process:

*Example I*

To 250 grams of a 25 weight percent Kenya extract in kerosene there was added 250 grams of deodorized kerosene. To the resulting mixture there was added 0.5 gram of trisodium phosphate dodecahydrate. The entire mixture was heated to 70° C. for one hour and then chilled to $-23°$ C. for 24 hours. At the end of this time the mixture was centrifuged at 13,000 g. at a temperature of $-10°$ C. to $-15°$ C. The filtrate obtained from the centrifuge was decolorized by adding 4 grams of Darco S–51, a proprietary active carbon, and 2 grams of Hi-flo Supercel, a proprietary filter aid, and agitating the mixture at 70° C. for 6 hours. After filtration the purified extract had a pyrethrin content of 11.17 weight percent and contained only 0.46 percent of Freon 12 insolubles. This corresponds very closely to Extract 100 which contains about 11.8 percent by weight of pyrethrins.

No precipitate formed when the above purified extract was diluted with 4 times its volume of Ultrasene. This dilution is commercially known as Extract 20 (containing about 2 grams of pyrethrins per 100 milliliters of solvent) which is commonly used in aerosols.

What is claimed is:

1. A method for the purification of a crude concentrated pyrethrum extract in which the solvent is a higher boiling hydrocarbon solvent and which contains approximately 20 to 30 weight percent of materials extracted from the pyrethrum flowers including the steps of admixing the extract with kerosene in amount such that the mixture contains from approximately 10 to 15 weight percent of pyrethrins and with about 0.01 to one percent by weight of trisodium phosphate dodecahydrate, based upon the weight of the crude concentrated pyrethrum extract plus added kerosene, heating the mixture at about 40° C. to 70° C. for about one to 24 hours, chilling the mixture at $-10°$ C. to $-30°$ C. for about one to 24 hours, and at a temperature of from $-10°$ C. to $-30°$ C. separating the sludge present from the remainder of the mixture.

2. The method of claim 1 wherein said higher boiling hydrocarbon solvent is kerosene.

References Cited in the file of this patent

UNITED STATES PATENTS

| | | |
|---|---|---|
| 2,044,502 | Haller et al. | June 16, 1936 |
| 2,372,183 | Barthel et al. | Mar. 22, 1945 |
| 2,413,107 | Kuhn | Dec. 24, 1946 |